United States Patent
Schulze

(10) Patent No.: US 8,925,567 B2
(45) Date of Patent: Jan. 6, 2015

(54) THERMAL PRESSURE RELIEF DEVICE WITH EXPANSION ACTIVATION

(75) Inventor: Jörg Schulze, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 113 days.

(21) Appl. No.: 13/337,927

(22) Filed: Dec. 27, 2011

(65) Prior Publication Data

US 2013/0160872 A1  Jun. 27, 2013

(51) Int. Cl.
*F16K 17/40* (2006.01)

(52) U.S. Cl.
USPC ............................................ 137/74; 137/72

(58) Field of Classification Search
USPC ............... 251/66, 67; 137/74, 71, 72; 236/92, 236/101 R, 102
See application file for complete search history.

(56) References Cited

U.S. PATENT DOCUMENTS

| | | | | |
|---|---|---|---|---|
| 2,036,391 A | * | 4/1936 | Bradley | 137/73 |
| 2,481,940 A | * | 9/1949 | Moorhead | 236/92 C |
| 2,501,185 A | * | 3/1950 | Moorhead | 236/92 C |
| 2,749,047 A | * | 6/1956 | Dotson | 236/102 |
| 3,178,149 A | * | 4/1965 | Curzon | 251/11 |
| 3,335,951 A | * | 8/1967 | Roush et al. | 236/87 |
| 3,559,668 A | * | 2/1971 | Crossman | 137/73 |
| 4,365,643 A | * | 12/1982 | Masclet et al. | 137/70 |
| 4,419,867 A | * | 12/1983 | Albagnac et al. | 62/51.2 |
| 4,750,510 A | * | 6/1988 | Short, III | 137/1 |
| 5,477,877 A | * | 12/1995 | Schulze et al. | 137/72 |
| 5,641,119 A | * | 6/1997 | Simonette | 236/92 C |
| 5,967,410 A | * | 10/1999 | Lammers | 236/93 R |
| 6,814,097 B2 | * | 11/2004 | Girouard | 137/72 |
| 6,820,633 B2 | * | 11/2004 | Liu | 137/73 |
| 7,971,798 B2 | | 7/2011 | Pechtold | |
| 2003/0136855 A1 | * | 7/2003 | Brown | 236/101 R |
| 2009/0038687 A1 | * | 2/2009 | Kremer et al. | 137/74 |

FOREIGN PATENT DOCUMENTS

| | | |
|---|---|---|
| DE | 2009194 A1 | 9/1970 |
| DE | 4220054 C1 | 9/1993 |
| DE | 3883147 T2 | 12/1993 |
| DE | 19600312 A1 | 7/1996 |
| DE | 602005004371 T2 | 2/2009 |
| DE | 102009019833 A1 | 12/2009 |
| DE | 102012213570 A1 | 2/2013 |

\* cited by examiner

*Primary Examiner* — John Rivell
*Assistant Examiner* — Umashankar Venkatesan
(74) *Attorney, Agent, or Firm* — Fraser Clemens Martin & Miller LLC; J. Douglas Miller

(57) ABSTRACT

A thermal pressure relief device (TPRD) is shown and includes a housing having a first end with a first aperture and a second end having a second aperture. The first and second apertures are configured to allow a fluid to flow through the housing. The TPRD includes a trigger member, such as a ball, disposed within the housing. The ball is seated laterally within a retainer. The retainer includes a rim forming a seat for supporting the ball within the housing. The movement of the ball from the first closed position laterally seated within the retainer to the second open position descended within the retainer is caused by an expansion of the rim of the retainer. The rim of the retainer is formed substantially of a temperature sensitive material adapted to expand volumetrically with an increase in temperature. The temperature sensitive material can expand linearly or non-linearly.

20 Claims, 2 Drawing Sheets

THERMAL PRESSURE RELIEF DEVICE WITH EXPANSION ACTIVATION

FIELD OF THE INVENTION

The disclosure relates to a thermal pressure relief device (TPRD) and, more particularly, to a TPRD for a high pressure vessel.

BACKGROUND OF THE INVENTION

The fuel cell has been proposed as a clean, efficient, and environmentally responsible power source for various applications. A plurality of fuel cells may be arranged to form a fuel cell stack capable of powering an electric vehicle. One example of the fuel cell is a Proton Exchange Membrane (PEM) fuel cell. In the PEM fuel cell, hydrogen is supplied as a fuel to an anode and oxygen is supplied as an oxidant to a cathode. A common technique for storing hydrogen is in a lightweight, high pressure vessel resistant to puncture. High pressure vessels containing the compressed hydrogen gas must have a desired mechanical stability and integrity that militates against an uncontrolled release of the compressed gas from the pressure vessel due to the internal pressure. It is also typically desirable to make the pressure vessels on vehicles lightweight so as not to significantly affect the weight requirements of the vehicle.

Known high pressure vessels include at least one thermally activated safety valve or pressure relief device (TPRD). The TPRD is located at a boss or an end of the high pressure vessel that houses various valves, pressure regulators, piping connectors, excess flow limiters, etc. for allowing the pressure vessel to be filled with the compressed hydrogen gas. The TPRD may also be located at another opening in the pressure vessel, though the TPRD generally is disposed at one or both ends of the pressure vessel. The TPRD is useful when the pressure vessel is exposed to high temperatures. More than one TPRD may be used where high temperatures might occur at a localized area apart from the location of the single TPRD. One known TPRD includes an elongated, fragile bulb coupled to an ignitable cord, which transfers heat to the TPRD from remote areas of the vessel. When heated to a predetermined temperature, the bulb breaks, thereby opening a venting aperture and actuating the TPRD. However, heat transfer to the TPRD by the ignitable cord is not suitable in certain applications and occasionally unpredictable. Further, the elongated bulb requires a large package size, as well as includes a significant volume of temperature sensitive material to be heated for actuation of the TPRD. Additionally, such a device may only be operated once. Following such operation, the TPRD is destroyed and must be replaced.

Another known TPRD is resettable. However, the trigger mechanism must be replaced, reset and tested after operation.

Another known TPRD has a thermally actuated trigger mechanism that interferes with a movement of a valve closure element. The trigger mechanism is formed of a shape memory alloy that expands when heated to a set temperature, eliminating the interference with the closure element and actuating the pressure relief device. This one-way shape memory trigger mechanism is expensive and involves several moving parts.

There is a continuing need for a TPRD that can be installed in a high pressure vessel for use with a fuel cell stack. Desirably, the TPRD includes a trigger mechanism that minimizes manufacturing cost.

SUMMARY OF THE INVENTION

In concordance and agreement with the present invention, a thermal pressure relief device with expansion activation that minimizes manufacturing cost has been surprisingly discovered.

In one embodiment, a thermal pressure relief device (TPRD) comprises a housing having a first end and a second end configured to allow a fluid to flow therethrough; a retainer disposed in the housing, the retainer having at least a portion formed of a temperature sensitive material configured to expand volumetrically with an increase in temperature; and a movable trigger member disposed adjacent the retainer and movable between an open position and a closed position, wherein at least a portion of the movable trigger member is configured to seal the second end of the housing when the movable member is in the closed position, and wherein the retainer permits movement of the movable trigger member from the closed position to the open position when a predetermined temperature of the temperature sensitive material is attained.

In another embodiment, a thermal pressure relief device (TPRD) comprises a housing including a first end having a first aperture and a second end having a second aperture configured to allow a fluid to flow therethrough; a piston slidably mounted in the housing and moveable between an open position and a closed position, the piston sealing the second aperture when the piston is in the closed position; a retainer disposed in the housing, the retainer having at least a portion formed from a temperature sensitive material configured to expand volumetrically with an increase in temperature; and a movable trigger member disposed within the housing and movable between an open position and a closed position, wherein the movable trigger member rests at least partially within the retainer when the movable trigger member is in the open position, and wherein the retainer permits movement of the movable trigger member from the closed position to the open position when a predetermined temperature of the temperature sensitive material is attained.

In another embodiment, a thermal pressure relief device (TPRD) comprises a housing including a first end having a first aperture and a second end having a second aperture configured to allow a fluid to flow therethrough; a piston slidably mounted in the housing and moveable between an open position and a closed position, the piston sealing the second aperture when the piston is in the closed position; a retainer fixedly disposed in the housing, the retainer having at least a portion formed from a temperature sensitive material configured to expand volumetrically with an increase in temperature; and a movable trigger member disposed within the housing and movable between an open position and a closed position, wherein the movable trigger member rests laterally within the retainer when the movable trigger member is in the closed position, and wherein the retainer permits movement of the movable trigger member from the closed position to the open position when a predetermined temperature of the temperature sensitive material is attained to allow the piston to move to the open position.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENTS

The following detailed description and appended drawings describe and illustrate various exemplary embodiments of the invention. The description and drawings serve to enable one skilled in the art to make and use the invention, and are not intended to limit the scope of the invention in any manner.

Figure 1:
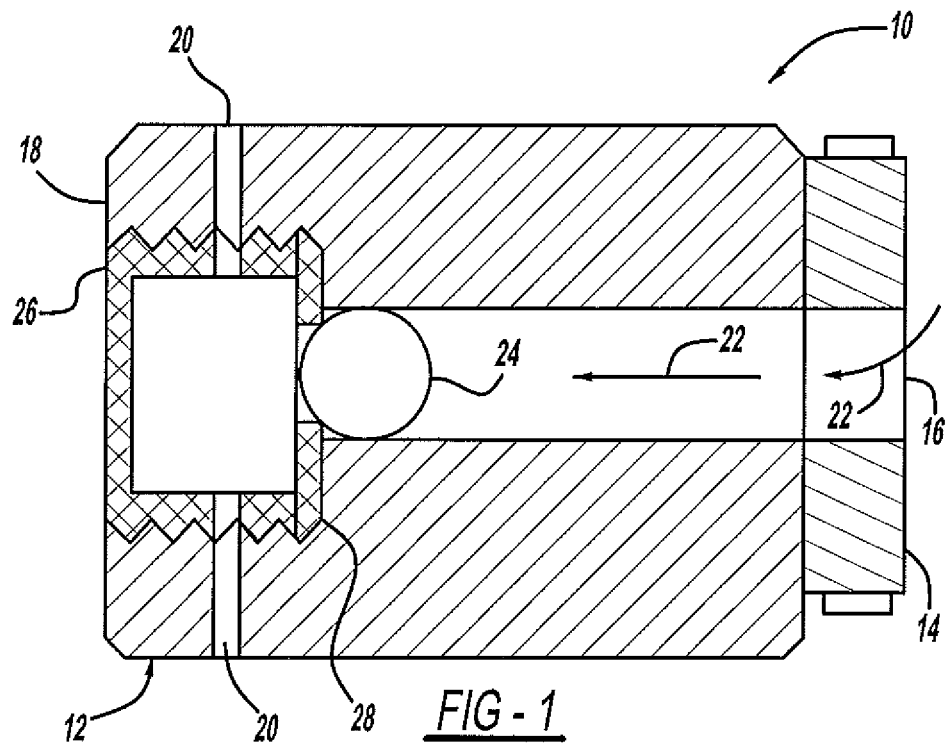
FIG. 1 is a schematic cross sectional elevational view of a TPRD, showing a movable trigger member in a closed position according to an embodiment of the present invention.
Figure 2:
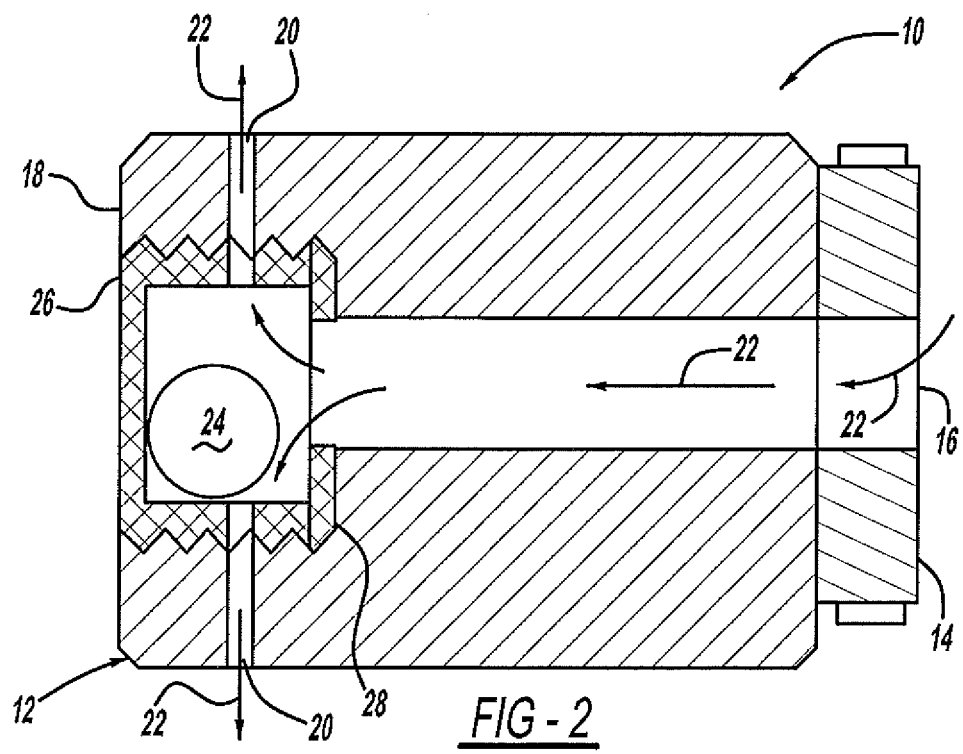
FIG. 2 is a schematic cross sectional elevational view of a TPRD illustrated in FIG. 1 and showing the movable trigger member in an open position.

In FIGS. 1 and 2, a thermal pressure relief device (TPRD) 10 is shown and includes a housing 12 having a first end 14 with a first aperture 16 and a second end 18 having a second aperture 20. The first and second apertures, 16, 20 are configured to allow a fluid 22 to flow through the housing 12. In one example, the fluid 22 may flow from a high pressure vessel (not shown) in fluid communication with the first aperture 16 through the housing 12 and the second aperture 20 to the ambient atmosphere when the TPRD is activated as illustrated in FIG. 2. The housing 12 may be configured for threadable engagement with the high pressure vessel, for example.

The TPRD 10 includes a trigger member 24 disposed within the housing 12. In the embodiment shown, the trigger member 24 is a sphere or a ball. Other suitable trigger members may be used. The ball 24 is seated laterally within a retainer 26. The retainer 26 includes a rim 28 forming a seat 30 for supporting the ball 24 within the housing 12. The ball 24 is formed of a material having a low thermal expansion rate such as glass or ceramic. The retainer 26 and the rim 28 are formed from a material having a higher thermal expansion rate than the ball 24. In one embodiment, the retainer 26 and the rim 28 are formed of metal. In another embodiment, at least the rim 28 is formed from a material having a higher thermal expansion rate than the ball 24 and the retainer 26. Other suitable materials may be used for the ball 24 and the retainer 26. Additionally, where the retainer 26 and the rim 28 are formed from the same material having a high thermal expansion rate such as metal, the retainer 26 may be shaped as a cage to aid in heat transfer to quicken the thermal expansion of the retainer 26 and the rim 28 when the TPRD 10 is triggered.

In the TPRD 10 of FIG. 1, the ball 24 is shown in a first closed position, sealing the first aperture 16 and the first end 14 of the housing 12 from the second aperture 20 and the second end 18 of the housing 12 and the atmosphere. In the first closed position, the ball 24 is seated laterally within the rim 28 of the retainer 26 and substantially blocks the fluid flow 22 between the first aperture 16 and the second aperture 20 through the housing 12. The ball 24 is movable to a second open position as shown in FIG. 2. The ball 24 falls into the retainer 26 and facilitates the fluid flow 22 from the high pressure vessel.

The movement of the ball 24 from the first closed position laterally seated within the retainer 26 to the second open position descended within the retainer 26 is caused by an expansion of at least the rim 28 of the retainer 26. The rim 28 of the retainer 26 is formed substantially of a temperature sensitive material adapted to expand volumetrically with an increase in temperature. The temperature sensitive material can expand linearly or non-linearly as desired. In one embodiment, the temperature sensitive material may expand linearly with temperature and expand primarily within a defined range. In another embodiment, the rim 28 is formed of a material having a high thermal expansion rate, such as metal. In still another embodiment, the rim 28 and the retainer 26 are both formed of the same material having a high thermal expansion rate, such as metal. Other suitable temperature sensitive materials may be selected. The housing 12 is formed from a thermally conductive material adapted to transfer heat from the ambient environment adjacent the TPRD 10 to the temperature sensitive material. The ball 24 is formed of a material having a low thermal expansion rate, such as glass or ceramic. Other suitable materials may be selected. In the embodiment shown, the thermal expansion rate of the ball 24 is lower than the thermal expansion rate of at least the rim 28.

During operation of the TPRD 10, at least the rim 28 of the retainer 26 expands when a desired temperature is attained causing the ball 24 to fall into the retainer 26 due to gravity. A suitable desired temperature associated with the particular high pressure vessel may be selected by a skilled artisan. Once the ball 24 falls into the retainer 26, the flow of the fluid 22 travels from the high pressure vessel and the first aperture 16 through the housing 12 and the second aperture 20 to be discharged into the ambient air or collected as desired.

Figure 3:
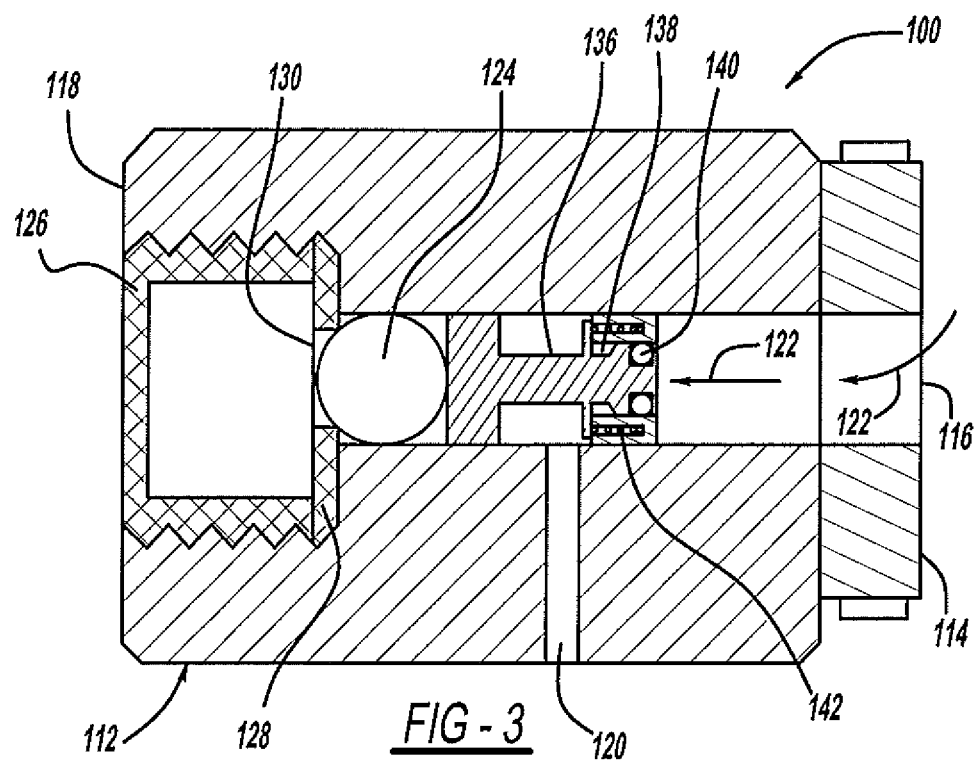
FIG. 3 is a schematic cross sectional elevational view of a TPRD, showing a piston in a closed position according to another embodiment of the present invention.
Figure 4:
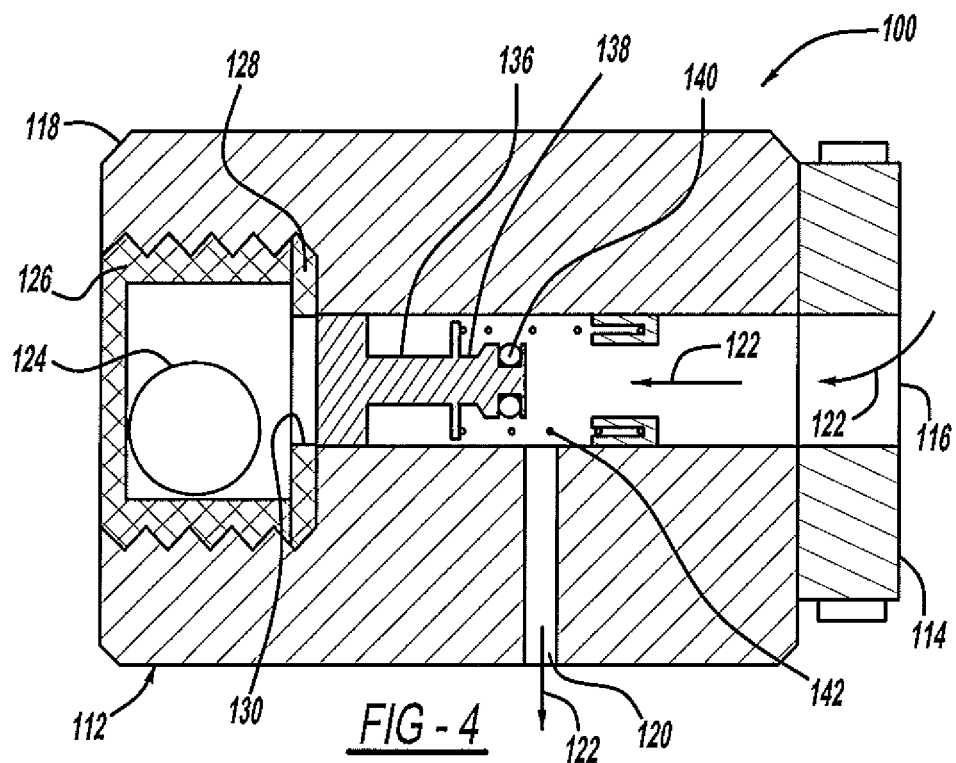
FIG. 4 is a schematic cross sectional elevational view of a TPRD illustrated in FIG. 3 and showing the piston in an open position.

FIGS. 3 and 4 illustrate another embodiment of the TPRD 100 and includes a housing 112 having a first end 114 with a first aperture 116 and a second end 118 having a second aperture 120. The first and second apertures, 116, 120 are configured to allow a fluid 122 to flow through the housing 112. In one example, the fluid 122 may flow from a high pressure vessel (not shown) in fluid communication with the first aperture 116 through the housing 112 and the second aperture 120 to the ambient atmosphere when the TPRD is activated as illustrated in FIG. 4. The housing 112 may be configured for threadable engagement with the high pressure vessel, for example.

In the embodiment shown, the TPRD 100 has a trigger member 124, which is shown as a sphere or a ball, disposed within the housing 112. The ball 124 is seated laterally within a retainer 126. The retainer 126 includes a rim 128 forming a seat 130 for supporting the ball 124 within the housing 112. The ball 124 is formed of a material having a low thermal expansion rate such as glass or ceramic. The retainer 126 and the rim 128 are formed of a material having a higher thermal expansion rate than the ball 124. In one embodiment, the retainer 126 and the rim 128 are formed of metal. In another embodiment, at least the rim 128 is formed of a material having a higher thermal expansion rate than the ball 124 and the retainer 126. Other suitable materials may be used for the ball 124 and the retainer 126. Additionally, where the retainer 126 and the rim 128 are formed from the same material having a high thermal expansion rate such as metal, the retainer 126 may be shaped as a cage to aid in heat transfer to quicken thermal expansion of the retainer 126 and the rim 128 when the TPRD 100 is triggered.

The TPRD 100 includes a piston 136 slidably disposed in the housing 112. The piston 136 is movable between a closed position as shown in FIG. 3 and an open position as shown in FIG. 4. The piston 136 may have at least one aperture 138 formed therein for facilitating the flow of the fluid 122 therethrough when the piston 136 is in the open position. When in the closed position, the piston 136 seals the first aperture 116. The piston 136 includes a sealing member 140 that forms a substantially fluid tight seal between the piston 136 and the housing 112 in the closed position. The piston 136 includes a piston spring 142. The piston spring 142 urges the piston 136 toward the open position. Other suitable means for sealing and moving the piston 136 between the closed and open positions may be employed.

In the TPRD 100 of FIG. 3, the ball 124 is shown in a first closed position, sealing the first aperture 116 and the first end 114 of the housing 112 from the second aperture 120 and the second end 118 of the housing 112 and the atmosphere. In the first closed position, the ball 124 is seated laterally within the rim 128 of the retainer 126 and holds the piston 136 in the closed position, substantially blocking the flow of the fluid 122 between the first aperture 116 and the second aperture 120 through the housing 112. The ball 124 is movable to a second open position as shown in FIG. 4. The ball 124 falls into the retainer 126, releasing the piston 136. The piston spring 142 urges the piston 136 into the second open position and selectively facilitates the flow of the fluid 122 from the high pressure vessel.

During operation of the TPRD 100, at least the rim 128 of the retainer 126 expands when a desired temperature is attained causing the ball 124 to fall into the retainer 126 due to gravity. A suitable desired temperature associated with a particular high pressure vessel may be selected by a skilled artisan. Once the ball 124 falls into the retainer 126, the piston 136 moves from the first closed position shown in FIG. 3 to the second open position shown in FIG. 4. In the open position, the flow of the fluid 122 travels from the high pressure vessel and the first aperture 116 through the housing 112 and the second aperture 120 to be discharged into the ambient air or collected as desired.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A thermal pressure relief device (TPRD) comprising:
    a housing defining a fluid flow passage having a first end and a second end configured to allow a fluid to flow therethrough;
    a retainer disposed in the housing, the retainer having at least a portion formed of a temperature sensitive material configured to expand volumetrically with an increase in temperature, the retainer including a rim having a diameter less than a diameter of the fluid flow passage, the retainer having a void formed therein; and
    a movable trigger member movable between an open position and a closed position, wherein in the closed position the movable trigger member is centrally aligned with a central axis of the fluid flow passage having at least a portion of the movable trigger member configured to contact the rim and to seal an end of the first fluid flow passage, and wherein in the open position the movable trigger member moves to a position substantially inside the void of the retainer and laterally offset from the central axis of the fluid flow passage, and wherein the retainer permits movement of the movable trigger member from the closed position to the open position when a predetermined temperature of the temperature sensitive material is attained.

2. The TPRD of claim 1, wherein the movable trigger member rests laterally within the retainer in the closed position.

3. The TPRD of claim 1, wherein the rim is formed from a material having a higher thermal expansion rate than the trigger member.

4. The TPRD of claim 3, wherein the rim is formed of a material having a higher thermal expansion rate than the retainer.

5. The TPRD of claim 1, wherein the retainer is formed from a material having a higher thermal expansion rate than the trigger member.

6. The TPRD of claim 1, wherein the trigger member is a ball formed of at least one of glass and ceramic.

7. A thermal pressure relief device (TPRD) comprising:
    a housing including a first end having a first aperture and a second end having a second aperture and a fluid flow passage therebetween configured to allow a fluid to flow therethrough;
    a piston slidably mounted in the fluid flow passage and moveable between an open position and a closed position, the piston sealing the second aperture when the piston is in the closed position;
    a retainer disposed in the housing, the retainer having at least a portion formed from a temperature sensitive material configured to expand volumetrically with an increase in temperature, the retainer including a rim having a diameter less than a diameter of the fluid flow passage, the retainer having a void formed therein; and
    a movable trigger member disposed within the housing and movable between an open position and a closed position, wherein the movable trigger member is directly contacted by the piston in the closed position and is freely spaced away from the piston to rest at least partially within the void of the retainer and laterally offset from a central axis of the fluid flow passage when the movable trigger member is in the open position, and wherein the retainer permits movement of the movable trigger member from the closed position to the open position when a predetermined temperature of the temperature sensitive material is attained, the moveable trigger member positioned inside the void of the retainer in the open position.

8. The TPRD of claim 7, wherein the piston is in the open position when the movable trigger member is in the open position.

9. The TPRD of claim 7, wherein the movable trigger member rests laterally within the retainer when the movable trigger member is in the closed position.

10. The TPRD of claim 8, wherein the TPRD is configured to allow the fluid to flow therethrough when both the piston and the movable trigger member are in the open position.

11. The TPRD of claim 7, the retainer further comprising a rim having a diameter less than a diameter of the fluid flow passage, wherein the rim is formed from a material having a higher thermal expansion rate than the trigger mechanism.

12. The TPRD of claim 11, wherein the rim is formed of a material having a higher thermal expansion rate than the retainer.

13. The TPRD of claim 7, wherein the retainer is formed from a material having a higher thermal expansion rate than the trigger member.

14. The TPRD of claim 7, wherein the trigger member is a ball formed of at least one of glass and ceramic.

15. A thermal pressure relief device (TPRD) comprising:
    a housing including a first end having a first aperture and a second end having a second aperture and a fluid flow passage therebetween configured to allow a fluid to flow therethrough;

a piston slidably mounted in the housing and moveable between an open position and a closed position, the piston sealing the second aperture when the piston is in the closed position;

a retainer fixedly disposed in the housing along the fluid flow passage, the retainer having at least a portion formed from a temperature sensitive material configured to expand volumetrically with an increase in temperature, the retainer including a rim having a diameter less than a diameter of the fluid flow passage, the retainer having a void formed therein; and a movable trigger member disposed within the housing and movable between an open position and a closed position, wherein the movable trigger member is directly contacted by the piston and rests laterally within the rim when the movable trigger member is in the closed position, the movable trigger member displaced into the void of the retainer and freely spaced away from the piston and laterally offset from a central axis of the fluid flow passage in the open position, and wherein the retainer permits movement of the movable trigger member from the closed position to the open position when a predetermined temperature of the temperature sensitive material is attained to allow the piston to move to the open position.

16. The TPRD of claim 15, wherein the piston is in the open position when the movable trigger member is in the open position.

17. The TPRD of claim 15, wherein the movable trigger member rests within the retainer when the movable trigger member is in the open position.

18. The TPRD of claim 15, wherein the retainer is formed of a material having a higher thermal expansion rate than the trigger member.

19. The TPRD of claim 15, wherein the rim is formed from a material having a higher thermal expansion rate than the trigger member.

20. The TPRD of claim 19, wherein the rim is formed of a material having a higher thermal expansion rate than the retainer.

* * * * *